United States Patent [19]
Allen

[11] Patent Number: 6,070,955
[45] Date of Patent: Jun. 6, 2000

[54] TRACKS FOR REMOTE CONTROLLED SLUDGE REMOVAL APPARATUS

[76] Inventor: Henry W. Allen, 12014 Lake Lery Ave., Baton Rouge, La. 70816

[21] Appl. No.: 09/013,462

[22] Filed: Jan. 26, 1998

Related U.S. Application Data

[60] Provisional application No. 60/036,457, Jan. 27, 1997.

[51] Int. Cl.[7] .................................................. B62D 55/26
[52] U.S. Cl. ............................................ 305/187; 305/191
[58] Field of Search ................................. 305/180, 187, 305/191, 192

[56] References Cited

U.S. PATENT DOCUMENTS

| | | | |
|---|---|---|---|
| 1,474,456 | 11/1923 | Watson | 305/191 |
| 1,820,743 | 8/1931 | Honstain | 305/191 |
| 3,307,882 | 3/1967 | McFayden | 305/191 X |
| 3,912,338 | 10/1975 | Toews | 305/191 |
| 4,218,101 | 8/1980 | Thompson | 305/180 |
| 5,138,741 | 8/1992 | Allen | 15/340.1 |
| 5,269,041 | 12/1993 | Allen | 15/340.1 |
| 5,335,395 | 8/1994 | Allen | 15/340.1 |
| 5,676,437 | 10/1997 | Holmgren et al. | 305/180 |

*Primary Examiner*—Russell D. Stormer
*Attorney, Agent, or Firm*—David L. Ray

[57] ABSTRACT

Improved tracks for a remote controlled sludge removal apparatus. The improved tracks include a plurality of spikes connected to the surface of the tracks at an angle to the tracks enabling the spikes to bite into sludge when the sludge removal apparatus of the invention is traveling forward.

1 Claim, 3 Drawing Sheets

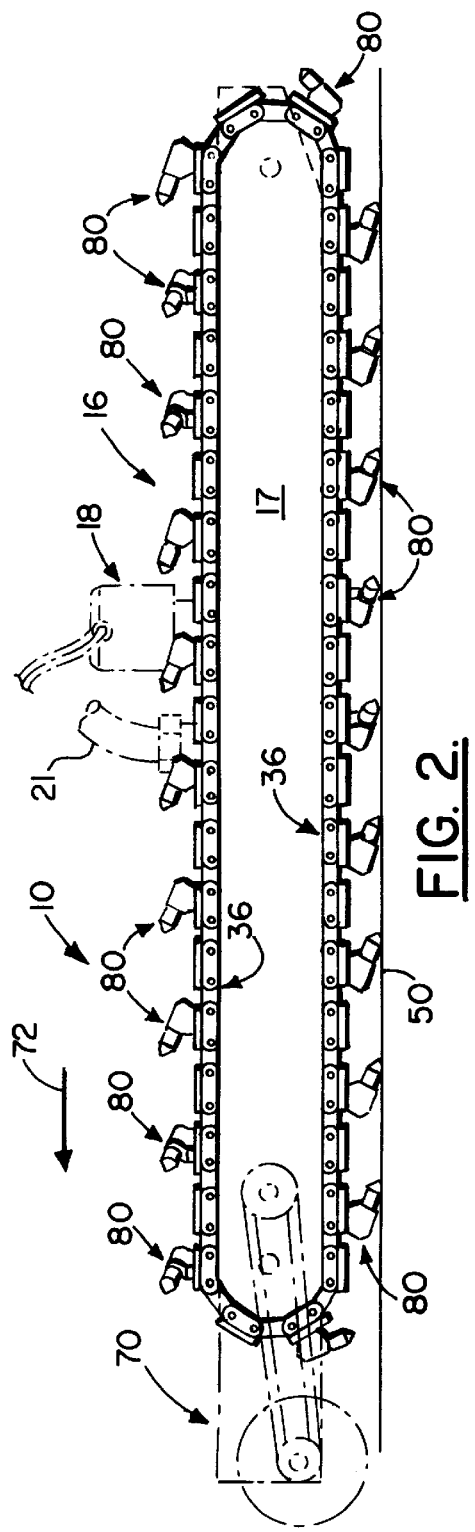
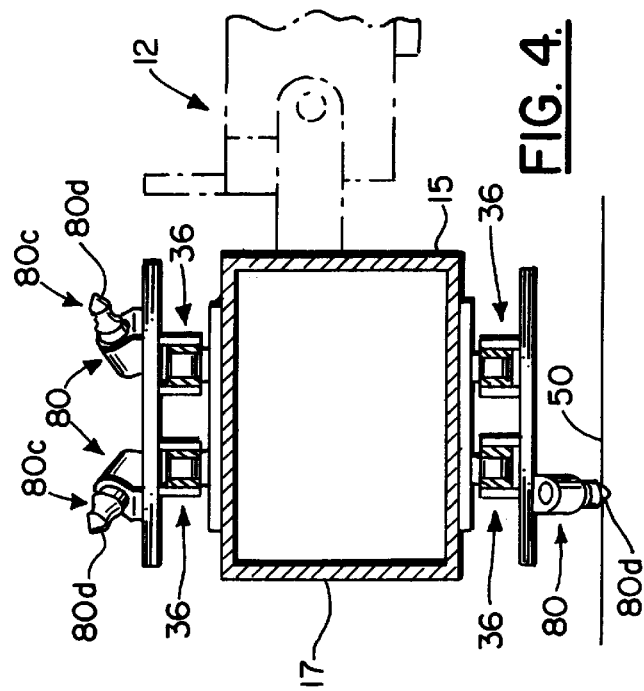

TRACKS FOR REMOTE CONTROLLED SLUDGE REMOVAL APPARATUS

CROSS-REFERENCE TO RELATED APPLICATIONS

This application claims the benefit of the filing date and priority of co-pending provisional application serial number 60/036,457 filed Jan. 27, 1997.

BACKGROUND OF THE INVENTION

1. Field of the Invention

The invention relates to remote controlled sludge removal apparatus. More particularly, the invention relates to improved tracks for remote controlled sludge removal apparatus. In particular, the invention relates to tracks for remote controlled sludge removal apparatus having spikes thereon for improving traction.

2. Description of the Related Art

My U.S. Pat. Nos. 5,335,395; 5,269,041; and 5,138,741 disclose sludge removal apparatus having tracks thereon for propelling the sludge removal apparatus over the area from which sludge is being removed. In some types of sludge being removed by the sludge removal apparatus, the speed at which the sludge removal apparatus of the invention can travel over the area to be cleaned is reduced due to some slippage of the tracks of the apparatus on the sludge being removed.

It is therefore an object of the invention to improve the traction of the tracks on sludge removal apparatus and reduce the amount of slippage of the tracks on the sludge being removed.

SUMMARY OF THE INVENTION

In accordance with the present invention improved tracks are provided for a remote controlled sludge removal apparatus. The improved tracks include a plurality of spikes connected to the surface of the tracks at an angle to the tracks enabling the spikes to bite into sludge when the remote controlled sludge removal apparatus is traveling forward.

BRIEF DESCRIPTION OF THE DRAWINGS

FIG. 2 is a schematic slide elevational view of the apparatus of FIG. 1;

FIG. 4 is a cross sectional view taken along lines 4—4 of FIG. 1.

DESCRIPTION OF THE PREFERRED EMBODIMENTS

The remote controlled sludge removal apparatus for which the improved tracks of the invention are particularly useful is disclosed in my U.S. Pat. Nos. 5,335,395; 5,269,041; and 5,138,741, which are hereby incorporated by reference.

Figure 1:
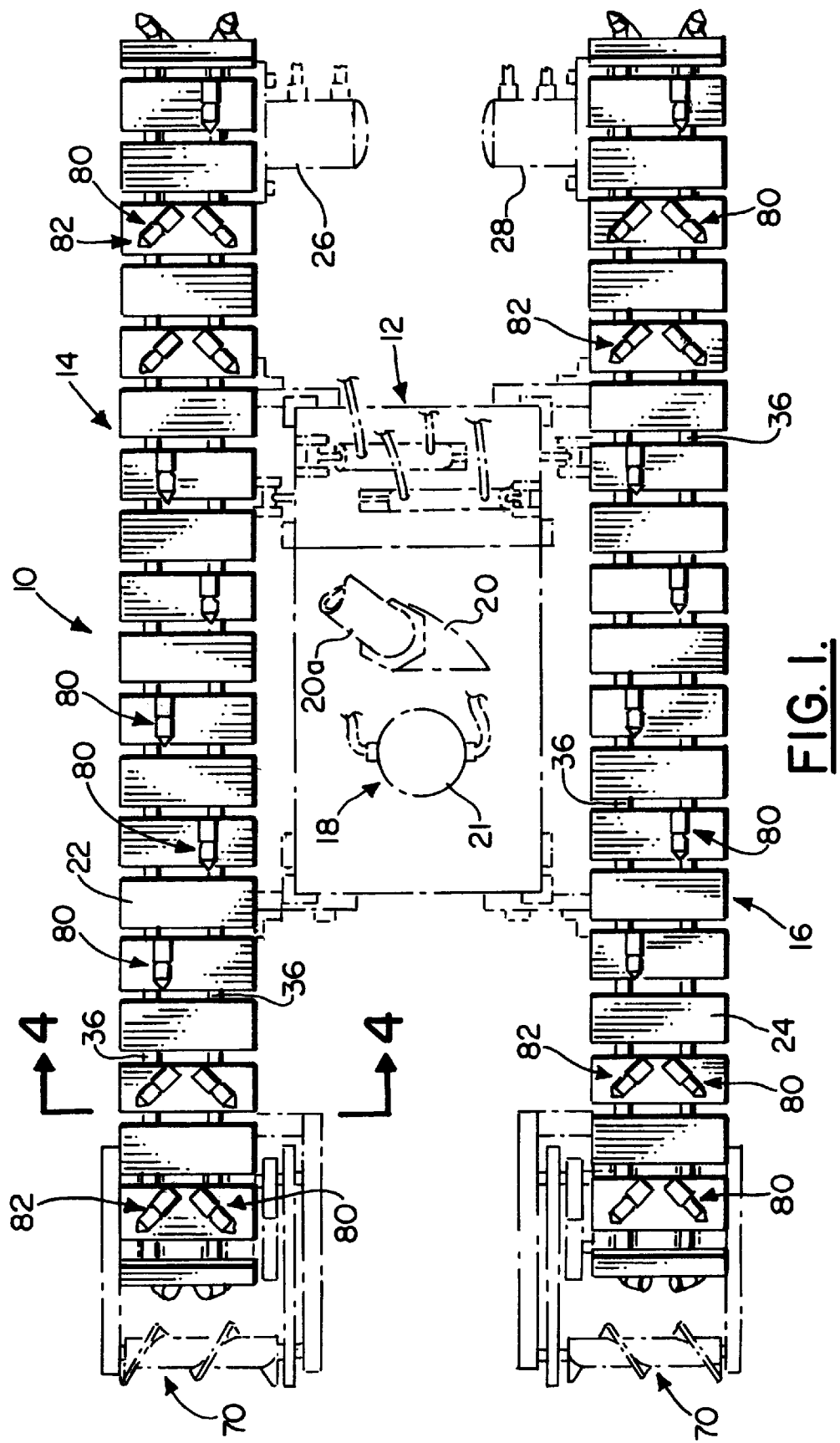
FIG. 1 is a schematic top view of the sludge removal apparatus having the improved tracks of the invention thereon.
Figure 3:
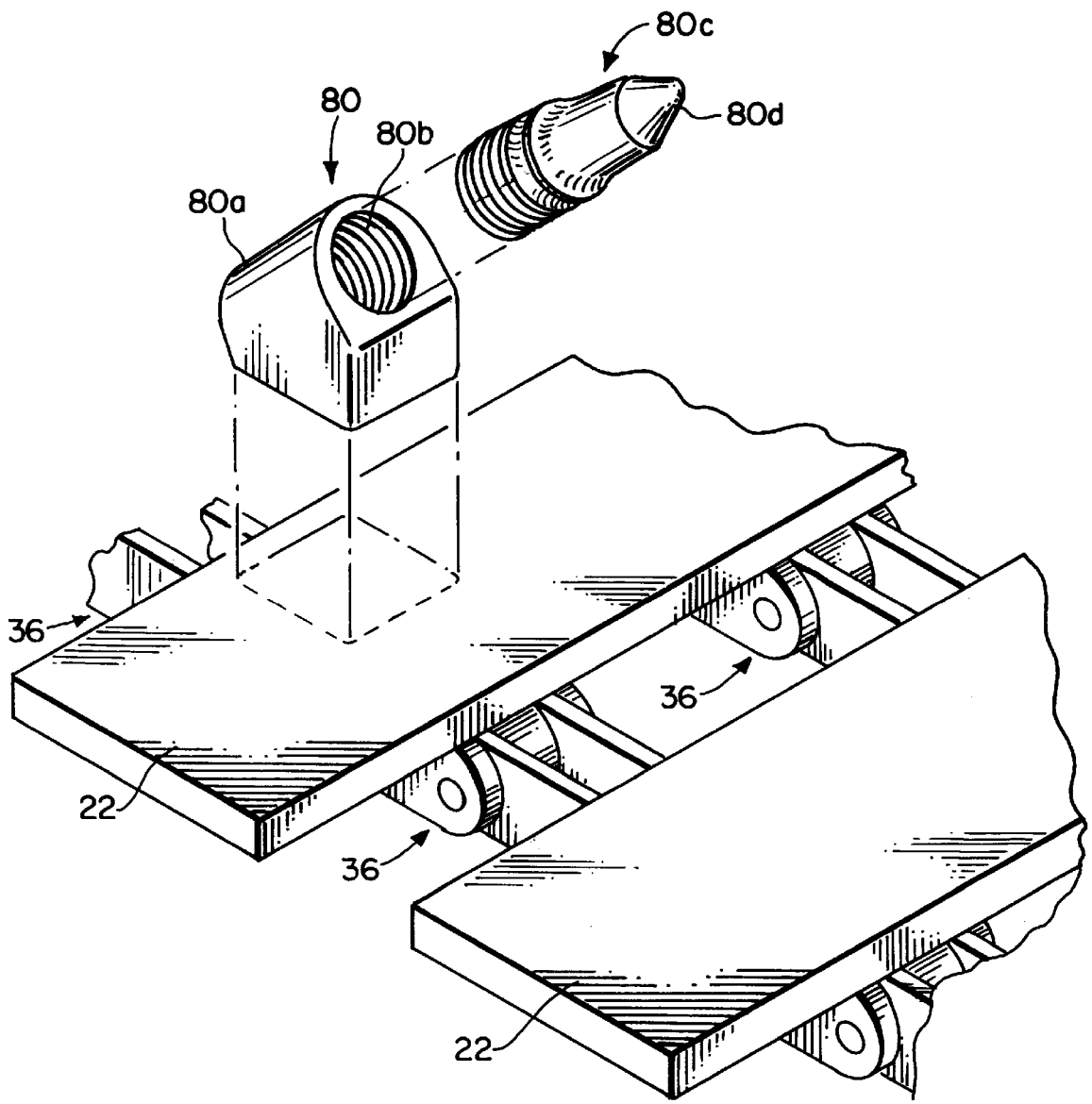
FIG. 3 is a perspective, partly cut-away, exploded detailed view of the track of one of a spike connected to a track of the sludge removal apparatus.

Referring now to the drawings, and in particularly to FIGS. 1 and 2, the sludge removal apparatus of the invention can be seen to be generally indicated by the numeral 10. By sludge is meant the viscous residue of hydrocarbons such as crude oil, such as sewerage digester settlement, sludge contained in sludge pits, radioactive nuclear waste deposited on the bottom of a radioactive nuclear waste storage area or any other type of sludge which is desired to be removed from a sludge containment area.

The sludge removal apparatus 10 shown in the drawings and disclosed in U.S. Pat. Nos. 5,335,395; 5,269,041; and 5,138,741, includes a platform generally indicated by the numeral 12 which is connected to two track assemblies generally indicated by the numerals 14 and 16 having inside track assembly walls 15 and outside track assembly walls 17, respectively, as shown in FIG. 4. Mounted on platform 12 is a pump generally indicated by the numeral 18 shown in phantom lines in FIGS. 1 and 2 having a discharge 20 and a bottom intake 21 connected thereto.

A hose 20a may be connected to discharge 20 to convey sludge from the inside of the tank or the area being cleaned to holding tanks or the like on the outside of the area being cleaned.

Connected to each of the track assemblies 14 and 16 are tracks 22 and 24 respectively. Tracks 22 and 24 are connected by the roller chain generally indicated by the numeral 36. Tracks 22 and 24 are driven at the rear ends by motors 26 and 28 respectively shown in phantom lines.

Located at the front of each track assembly 14 and 16 is an auger assembly 70. Auger assembly 70 cuts sludge 50 and forces the sludge 50 to the area between the track assembly for intake by pump 18. When sludge removal apparatus 10 is moving forward in the direction indicated by arrow 72 in FIG. 2, the top of track assembly 17 is moving the same direction as the arrow 72 and the bottom of the track assembly 17 is moving in the opposite direction as will be known to those skill in the art.

The improved tracks of the invention utilize a plurality of spike assemblies connected to the outer surfaces of the tracks 22 and 24 to improve traction when the sludge removal apparatus 10 is traveling forwardly in the direction indicated by the arrow 72 in FIG. 2. The spike assembly of the invention includes a metal socket 80a which is welded to the surface of the tracks 22 and 24.

The sockets 80a —80a preferably have a plurality of threads 80b therein for receipt of threaded spike 80c. Spike 80c preferably has a pointed tip 80d thereon which engages the sludge 50 shown in FIG. 4 to increase the traction or friction between sludge removal apparatus 10 and the sludge 50 over which the apparatus 10 is traveling. By increasing the traction of the sludge removal apparatus 10 by utilization of the spike assembly 80, the forward force driving sludge removal apparatus 10 of the direction indicated by the arrow 72 in FIG. 2 is increased thereby increasing the speed with which the sludge removal apparatus 10 travels over the sludge to be removed.

The spike assemblies 80—80 are positioned on each track 22 and 24 so that the spikes on the bottom of the track are pointing toward the rear of the sludge removal apparatus 10 of the invention and the spike assemblies 80—80 on top of the tracks are pointing forward toward augers 70—70.

Preferably spikes 80c form an angle with the horizontal from about 10 to about 46 degrees. More preferably the spikes 80—80 of the present invention form an angle with horizontal of from about 15 to 30 degrees. As can be seen in FIG. 1 and FIG. 4 some of the tracks have a pair of spike track assemblies 80—80 thereon which point toward the rear of the sludge removal apparatus 10 of the invention when the spikes are rotated to the bottom of the sludge removal apparatus 10 and actually make contact with the sludge 50.

The pairs of spike assemblies 80c generally indicated by the numeral 82 preferably form an angle about 90 degrees with each other.

It should be noted that since the spike tracks 80—80 contacting sludge 50 are angled toward the rear of the sludge removal apparatus 10 when the sludge removal apparatus 10 is traveling forwardly is indicated by the arrow 72 in FIG. 2, when the tracks are reversed in rotation, very little improvement in traction will result.

Although the preferred embodiments of the invention have been described in detail above, it should be understood that the invention is in no sense limited thereby, and its scope is to be determined by that of the following claims:

What is claimed is:

1. A track assembly for propelling a remote controlled sludge removal apparatus over sludge, said track assembly comprising:
   a. a plurality of individual generally rectangular tracks connected to a plurality of continuous roller chains, said tracks having an inner surface connected to said roller chains and an outer surface for engaging said sludge,
   b. a plurality of said tracks having a single spike connected to said outer surface thereof and a plurality of said tracks have a pair of spikes connected to said outer surface thereof, each of said spikes having a cone-shaped tip for engaging said sludge as said sludge removal apparatus travels over said sludge, each of said spikes being connected to each of said tracks by a rigid socket rigidly connected directly to said outer surface of said tracks, each of said single spikes and said pair of spikes forming an angle with the horizontal of from about 10 to 30 degrees,
   c. said tracks which have said single spike thereon having said single spike connected to said track an angle thereto wherein said single spike is pointed toward the rear of said sludge removal apparatus when said single spike engages said sludge, said single spike lying in a vertical plane parallel to the direction of travel of said sludge removal apparatus, and
   d. said tracks which have a pair of spikes thereon having each of said pair of spikes being pointed generally toward the rear of said sludge removal apparatus, said pair of spikes being aligned at an angle therebetween of about 90 degrees and each of said pair of spikes being aligned at an angle of about 45 degrees with the direction of travel of said sludge removal apparatus.

\* \* \* \* \*